Dec. 1, 1942.  J. J. WYDLER  2,303,714
POWER GENERATING METHOD AND APPARATUS
Filed May 5, 1941  3 Sheets-Sheet 1
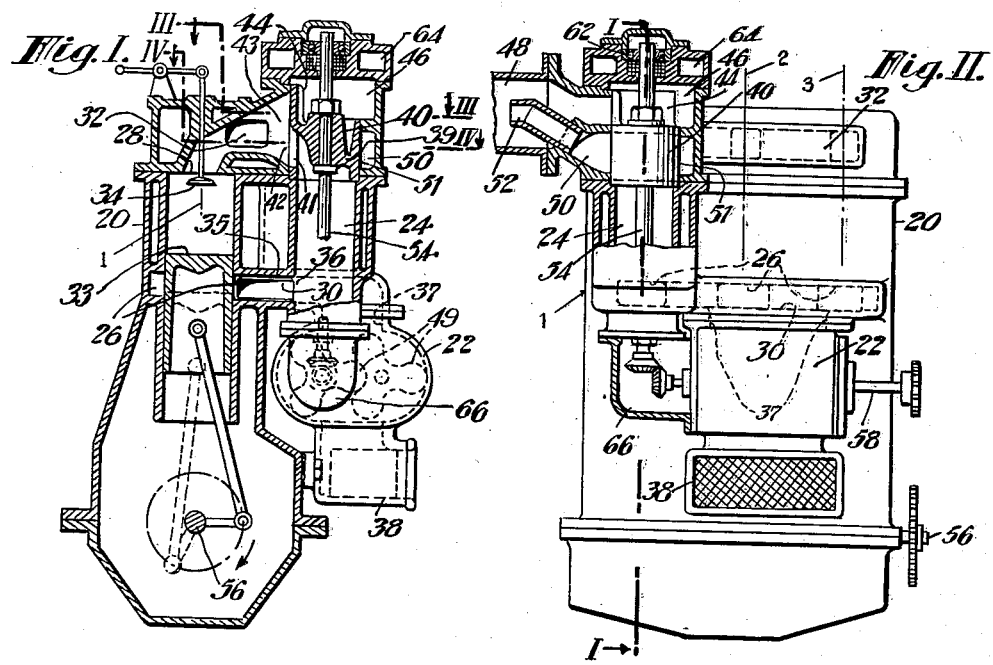
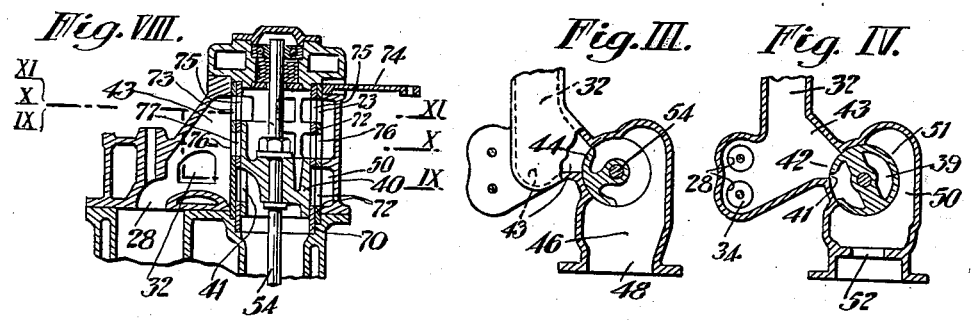
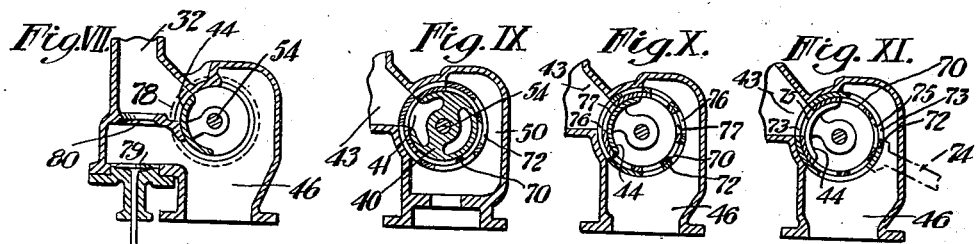
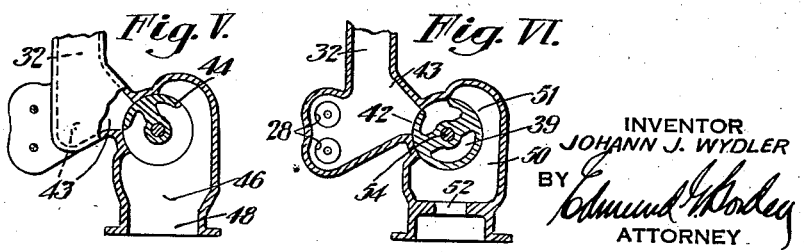
INVENTOR
JOHANN J. WYDLER
BY
ATTORNEY Dec. 1, 1942.   J. J. WYDLER   2,303,714
POWER GENERATING METHOD AND APPARATUS
Filed May 5, 1941   3 Sheets-Sheet 2
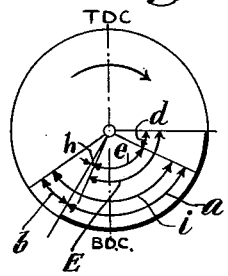
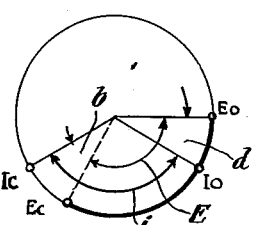
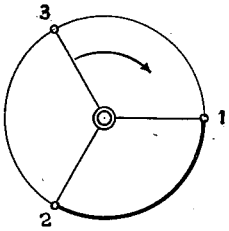
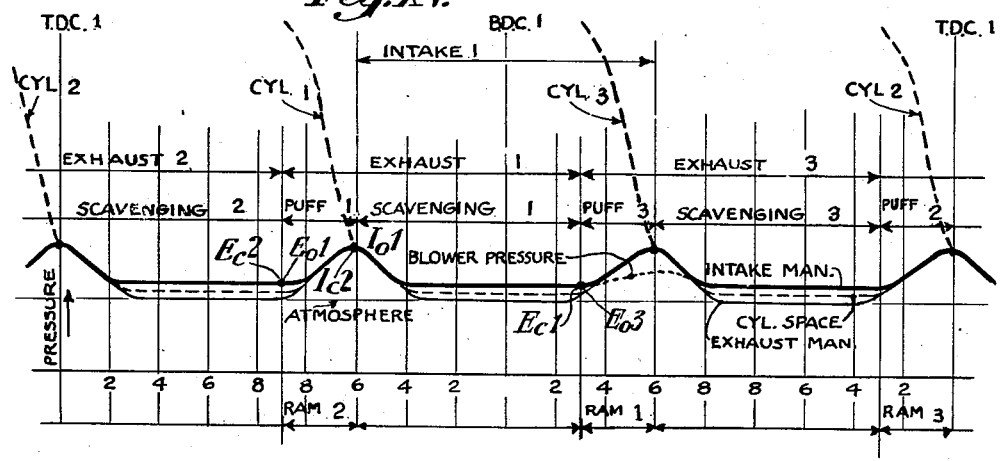
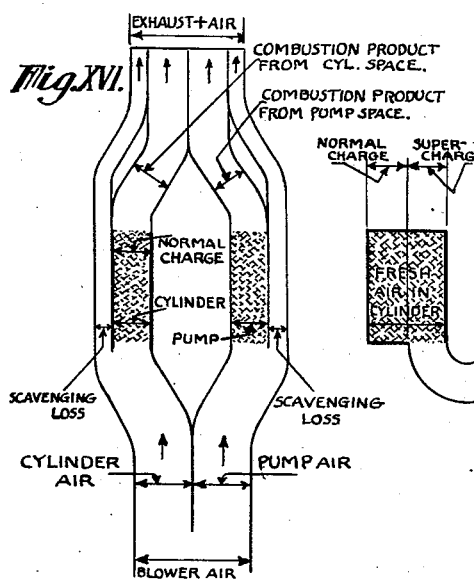
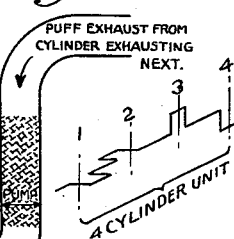
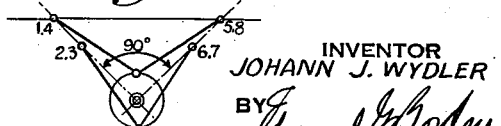
INVENTOR
JOHANN J. WYDLER
BY
ATTORNEY

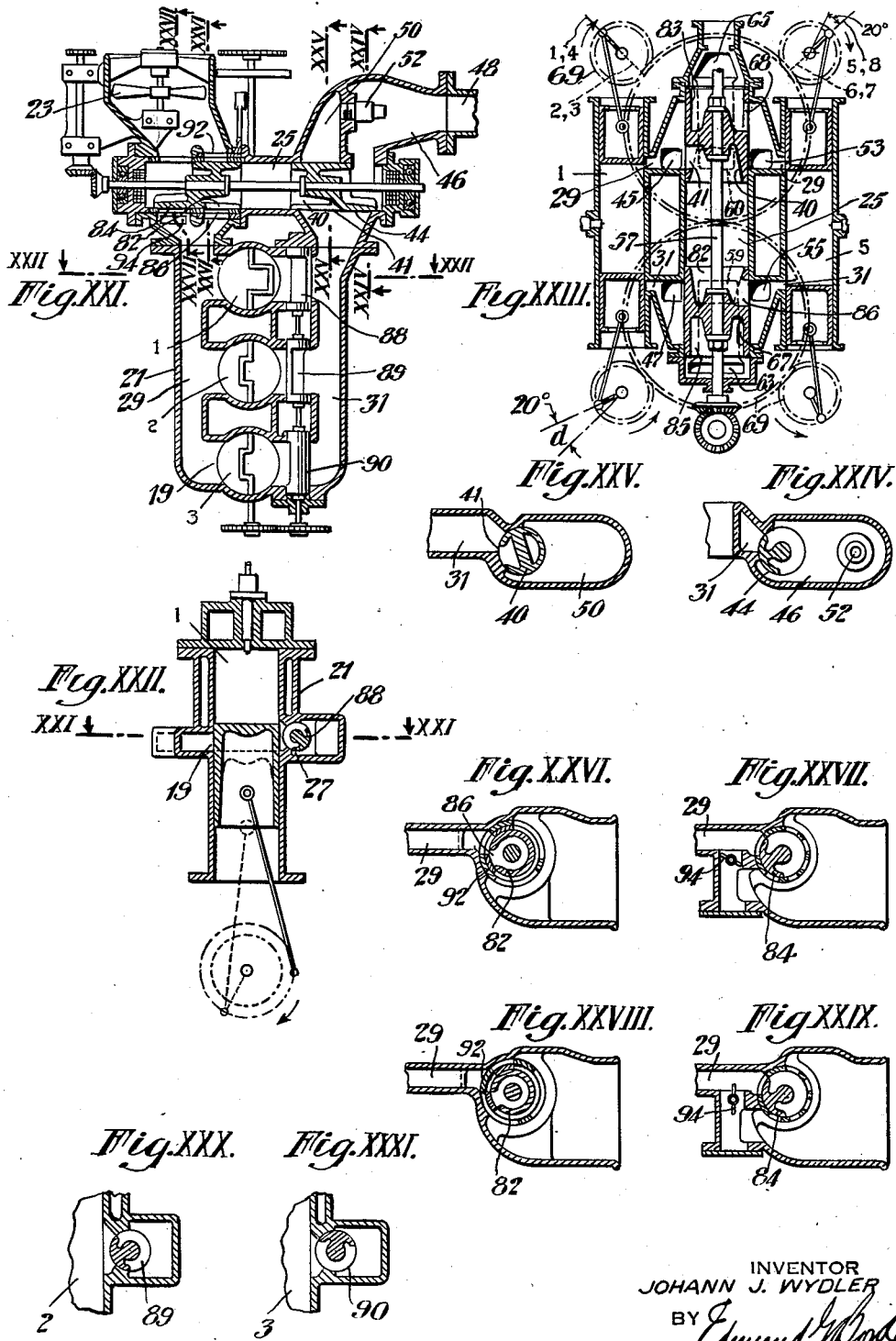

Patented Dec. 1, 1942

2,303,714

UNITED STATES PATENT OFFICE 2,303,714

POWER GENERATING METHOD AND APPARATUS

Johann J. Wydler, Westfield, N. J., assignor to Cities Service Oil Company, New York, N. Y., a corporation of Pennsylvania Application May 5, 1941, Serial No. 391,897

18 Claims. (Cl. 123—65)

This invention relates to two-stroke cycle internal combustion engines, and particularly to an improved energy conversion and supercharging operation adapted for practice within the two-stroke engine cycle.

The present invention is a continuation-in-part of and improvement on that described in my copending application Serial No. 361,351, filed October 16, 1940, for Gas pumping. A primary object of this invention is that of increasing the power developing capacity of a two-stroke cycle internal combustion engine.

Modern two-stroke cycle internal combustion engines are usually equipped with a rotating vane or Root's type blower powered from the crank shaft for the purpose of supplying air under superatmospheric pressure with which to scavenge the cylinders during the gas exhaust periods while the pistons are moving through bottom dead center positions between the working and charge compression strokes. For efficient operation the blower capacity must substantially exceed the volumetric capacity of the cylinders in order to supply a full cylinder charge of fresh combustion air and enough additional air to sweep out gaseous products of combustion during the brief interval allowed for scavenging. Even when the blower capacity is such as to build up the scavenging air pressure several pounds above atmospheric, no supercharging effect is obtained in engines operating with symmetrical port timing (with the exhaust port open before the air port opens and after the air port is closed). By redesigning the engine to operate with unsymmetrical port timing (the exhaust port open before the air port but both closing simultaneously and with an additional air port remaining open after the exhaust port has closed), it is possible to supercharge the engine to the extent of boosting the air pressure in the cylinder at the beginning of the compression period up to a point near the scavenging blower pressure level.

A particular object of the present invention is to provide method and means whereby to supercharge a two-stroke cycle engine to a pressure much above that which it is practical to develop by means of a scavenging air blower.

Another object of the invention is to supply the power for the supercharging operation without imposing additional load on the engine crank shaft by utilizing directly some of the kinetic and pressure energy available in the normally waste gaseous products of combustion which are exhausted under comparatively high initial pressure and high velocity from the engine cylinders.

For practicing the present invention the exhaust ports of the engine cylinders are timed to open before the air intake ports, and to close before the intake ports close. In addition to providing a scavenging air blower of relatively large capacity which is operated so as to develop moderate scavenging pressure economically, the engine is further equipped with a displacement air compressor which is used to ram supercharge air under high pressure into one engine cylinder during the last part of its air intake period after the exhaust port is closed, utilizing as the compressing and ramming agent a high pressure puff wave of exhaust gases discharged from the exhaust port of another cylinder at the commencement of its gas exhaust period (before its scavenging air port is opened). A single displacement compressor of simple and inexpensive design and low weight can be operated to serve an engine having three to eight cylinders. The capacity of the scavenging blower should be sufficient to supply scavenging air for an engine cylinder and to supply additional air for scavenging and refilling the displacement compressor for use in supercharging.

By dividing the gas exhaust period of each two-stroke cycle engine cylinder into an initial puff exhaust "ramming" phase and a final scavenging exhaust phase, a substantial proportion of the total weight of combustion gases in the cylinder at the beginning of the gas exhaust period can be discharged during the first phase as a high pressure puff wave moving outwardly from the cylinder into one end of the displacement compressor at high initial pressure and at high velocity. In the operation of a three-cylinder two-cycle engine three puff exhaust waves are produced during one full engine cycle of one revolution, and the peaks of such waves are spaced at equal time intervals. The time during which each puff exhaust wave is utilized to compress and ram a supercharge of air into the engine intake manifold may be limited to a period equivalent to approximately 20°-30° crank angle of the engine.

The displacement compressor may take the form of a gas piston pump or compressor in which a body of air first introduced into the pump chamber is compressed and then discharged by a non-turbulent stratified layer or wave of hot exhaust gases under pressure moving forward in direct contact with and displacing the air in the pump chamber without substantial mixing with or contamination of the air by the gas. This displacement compressor is adapted for operation at such speed as to enable it to utilize within a single compressor the ramming effects of the successive puff discharges of as many as four two-cycle engine cylinders, (or eight cylinders operating in pairs), for compressing air and discharging it from the compressor space directly into air intaking cylinders. Such a compressor must be operable to complete its cycle, including sufficient time for scavenging with fresh air at the end of the cycle, within a period of 90° crank angle of the engine with which the compressor is operatively connected.

With the above and other objects and features in view, the invention consists in the improved two-stroke internal combustion cycle and apparatus therefor which is hereinafter described and more particularly defined by the accompanying claims.

In the following description of the invention reference will be made to the accompanying drawings, in which:

Fig. I is a view partly in end elevation and partly in vertical section, taken on the broken line I—I of Fig. II, showing an assembly of a three-cylinder two-cycle uniflow engine together with a Root's type scavenging blower and a gas displacement air compressor, in accordance with the present invention.

Fig. II is a view in side elevation of the engine-blower-compressor assembly of Fig. I, showing the upper portion of the compressor in vertical section, with the gas transfer valve in elevation.

Fig. III is a cross-sectional view of the exhaust gas bypass valve located adjacent the gas transfer end of the compressor, taken on the line III—III of Fig. I.

Fig. IV is a cross-sectional view of the puff exhaust gas transfer valve at the gas inlet end of the compressor, taken on the line IV—IV of Fig. I.

Figs. V and VI are cross-sectional views corresponding respectively to Figs. III and IV, showing the bypass and transfer valves in the positions which they assume at a later period in the operating cycle of the compressor.

Fig. VII is a cross-sectional view of a modification of the arrangements shown in Figs. III, IX and X including an additional valved gas bypass port allowing for continuously bypassing the displacement compressor to permit operation of the engine without supercharging.

Fig. VIII is a view in vertical section of the gas transfer end of the compressor illustrating a modified construction of exhaust gas transfer and bypass valves in which annular apertured sleeve valves are provided for adjusting the unit for operation with or without supercharging.

Figs. IX, X and XI are cross-sectional views of the gas transfer and bypass valves of Fig. VIII, taken respectively on the lines IX—IX, X—X and XI—XI.

Figs. XII, XIII and XIV are polar diagrams illustrating suitable valve port timing arrangements for operation of a three-cylinder two-cycle engine, in accordance with the invention.

Fig. XV is a pressure-time chart illustrating the pressure performance and the valve timing over one full revolution of a three-cylinder engine.

Fig. XVI is a gas flow diagram showing the proportions of scavenging air which the blower has to deliver to an engine cylinder and to the displacement pump or compressor.

Fig. XVII is a gas flow diagram showing the flow path of supercharge air from the displacement compressor into the engine cylinder.

Fig. XVIII is a polar diagram comparable to that of Fig. XIII showing the valve timing for a four-cylinder engine.

Fig. XIX is a crank diagram showing how the cylinders of an eight-cylinder in line engine may be operatively paired for the practice of the invention.

Fig. XX is a crank diagram showing how the cylinders may be paired for the practice of the invention where a V-8 engine is part of the assembly.

Fig. XXI is a view in horizontal section taken on the line XXI—XXI of Fig. XXII showing an assembly of three-cylinder two-cycle engine having piston controlled intake and exhaust ports, together with a scavenging air fan and a displacement air compressor, in accordance with the present invention.

Fig. XXII is a vertical sectional view through one cylinder of the engine of Fig. XXI, taken on the line XXII—XXII of Fig. XXI.

Fig. XXIII is a schematic view in longitudinal section showing two cylinders of an opposed piston type two-cycle engine operatively connected with a scavenging air supply duct and displacement compressor, in accordance with the present invention.

Fig. XXIV is a cross-sectional view of the exhaust gas bypass control valve, taken on the line XXIV—XXIV of Fig. XXI.

Fig. XXV is a cross-sectional view of the puff exhaust transfer control valve at the gas inlet end of the displacement compressor, taken on the line XXV—XXV of Fig. XXI.

Fig. XXVI is a cross-sectional view of the supercharge air transfer control valve at the air discharge end of the compressor, taken on the line XXVI—XXVI of Fig. XXI.

Fig. XXVII is a cross-sectional view of the scavenging air bypass control valve taken on the line XXVII—XXVII of Fig. XXI.

Figs. XXVIII and XXIX are cross-sectional views corresponding respectively to Figs. XXVI and XXVII, showing the sleeves and valves of Figs. XXVI and XXVII in the positions which they would assume at a corresponding period of the compressor cycle when the compressor is disconnected for operation of the engine without supercharging.

Figs. XXX and XXXI are cross-sectional views of the exhaust port control valves of two of the three cylindners of the engine of Fig. I, showing the relative positions of these valves at the same period of the engine cycle portrayed by Fig. XXII for the other cylinder.

In the apparatus assembly which is illustrated in Figs. I and II, a three-cylinder two-stroke cycle internal combustion engine 20 is shown as operatively connected with a Root's type blower 22 and with a gas displacement air compressor 24 in such a way that the blower supplies air under moderate superatmospheric pressure for scavenging the engine cylinders and the compressor 24, while the displacement compressor is used to supply supercharging air under much higher pressure by utilizing energy derived from the engine exhaust gases. When the compressed air is used for supercharging an engine which furnishes the exhaust gas employed in the displacement compressor, the volume of exhaust gases produced by the engine is proportionately increased and thereby more energy is made available for operating the displacement compressor. This energy buildup takes place gradually over several initial cycles of the displacement compressor until a pressure balance is secured. This self-boosting is an advantage of employing the gas displacement compressor of the present invention as a supercharger which is not realized at all with a mechanically-driven blower-supercharger.

In the drawings numerals 1, 2, 3, 4, 5, 6, 7 and 8 designate correspondingly numbered engine cylinders. Each of the three cylinders of the engine of Fig. I has intake wall ports 26 at its lower end, and each cylinder is provided with a pair of gas exhaust ports 28 in its head. The intake ports of all cylinders are connected by a common intake manifold 30, and the exhaust ports are all connected by a common exhaust manifold 32. Opening and closing of the intake ports is controlled by movement of a piston 33 in each cylinder, while opening and closing of the exhaust ports is shown to be under the control of poppet valves 34. Intake ports 26 and manifold 30 openly communicate by way of an air transfer conduit 35 with an air intake and discharge port 36 at the lower end of displacement compressor 24, and manifold 30 in turn communicates with a discharge port 37 of blower 22. Atmospheric air enters the intake side of blower 22 through an air filter 38.

A cylinder valve 40 is rotatably journaled at the upper end of compressor 24 and is provided with a wall port 41 whereby communication can be established by way of a gas inlet port 42 in the compressor housing and a gas transfer conduit 43 between the upper end of the compressor and the exhaust manifold 32 and cylinder exhaust ports 28. Valve 40 is provided with a semicylindrical extension 44 which serves as a gas bypass control valve to alternately make and break communication between gas transfer conduit 43 and a gas bypass and expansion chamber 46 from which a waste discharge stack 48 leads off to atmosphere. Valve 40 is partly encircled by an expansion chamber 50 with which the upper end of the compressor may be connected by way of gas discharge port 51 whenever port 41 of the valve rotates clockwise between the positions illustrated in Figs. VI and IV, at which period in the compressor cycle displacement gases can be discharged from the compressor into chamber 50 and thence through a nozzle 52 and gas outlet 48 to atmosphere.

The tubular housing of the displacement compressor 24 preferably has a length greater than its maximum internal diameter. The compressor chamber 24 need have a cubic capacity only sufficient to handle the volume of air necessary for supercharging one cylinder of a three-cylinder unit. In the drawings a valve drive shaft 54 has been shown as mounted coaxially within the compressor housing. The cylindrical walls of valve 40 are connected to shaft 54 by an imperforate hub web 39 which in turn forms the upper end wall of the displacement compressor. The meshed lobes 49 of the rotors in the blower 22 block escape of compressed air from the lower end of the compressor to atmosphere. The supporting hub of valve 40 is keyed to shaft 54 for rotation therewith. The imperforate web connecting the hub to the valve wall does not extend perpendicularly between the hub and the wall, but extends obliquely thereto.

Fig. I portrays in full lines the exhaust valves, piston and connecting rod of cylinder 1 at the instant after discharge of exhaust gases begins, while the corresponding position of the piston and crank of cylinder 2 at this instant is shown in dotted lines. With the valve 40 in the position illustrated in Figs. I and IV, the valve is just beginning to open to connect the exhaust gas inlet end of the compressor with exhaust ports 28 of cylinder 1, while extension web 44 (Figs. I and III) blocks communication between ports 28 and bypass chamber 46. After substantially 90° clockwise rotation of the valve 40 beyond the position illustrated in Figs. I and IV, port 41 of the valve comes into register with gas discharge port 51 (Fig. VI) through which gas may be discharged from the compressor 24 into chamber 50, and thence through nozzle 52 to pipe 48. At this same instant valve extension 44 opens communication from cylinder exhaust ports 28 into chamber 46 and waste pipe 48 (Fig. V).

Since the air intake ports of the engine cylinders are under the control of the pistons 33, these pistons in effect form part of the valve mechanism controlling the operation of the unit. The entire control mechanism, including the rotors of the blower 22, is actuated from crank shaft 56 through blower shaft 58 which may operate at three times the speed of the engine crank shaft. The drive shaft 54 for the compressor control valve 40 is journaled at opposite ends of the compressor on ball bearings 62. The ball bearings at the hot exhaust gas transfer end of the compressor have been illustrated as protected and cooled by a water jacket 64. The lower bearing of the valve shaft 54 is designed to carry any thrust load produced by the puff exhaust gas ramming operation within the compressor, while the upper bearing takes care of any radial loads on the shaft, and is designed to permit axial movement of the shaft. An air-tight housing 66 is provided for the bevel gear transmission to prevent loss of air from the housings of the compressor and blower.

Figs. I to VI portray a unit which is adapted for operation with continuous supercharging of the engine cylinders. Figs. VII to XI present modifications in design permitting operation of the engine with or without supercharging. In these modified constructions additional poppet and sleeve valves are provided which are so disposed with respect to valve 40 that they may block transfer of exhaust gases from the engine cylinders into the compressor and permit such exhaust gases to bypass directly to outlet stack 48 throughout the entire gas exhaust period. Figs. VIII to XI portray a construction in which the valve 40 is journaled within an apertured sleeve bushing 70 which is tightly fitted as a stationary element within seats in the compressor housing. An adjustable rotatable apertured sleeve valve 72 is in turn loosely and rotatably fitted over stationary sleeve 70 and is arranged for manual rotation by means of a crank arm 74. Certain apertures in stationary sleeve 70 are aligned with the normal port openings in valve 40, 44 and in its housing, and other apertures afford additional transfer ports 75 above the end of valve 40, 44, permitting continuous communication between the engine exhaust manifold and the bypass chamber 46 whenever the manually controlled sleeve valve 72 is in a position opening such bypass chamber connection and blocking transfer of gases from the exhaust manifold into the compressor through the port 41 of the valve 40.

In Figs. VIII to XI, the adjustable sleeve valve 72 is illustrated in the position which it would assume for operation of the engine without supercharging. The sections of the valve portrayed by Figs. VIII and IX show the transfer port 41 between the exhaust manifold and the compressor blocked by valve 72. In Figs. VIII and XI the apertures 73 in the upper end of the valve 72 are shown as registering with apertures 75 in the inner sleeve 70 above the end of segment 44, to provide a permanent communication between the exhaust manifold and the bypass chamber 46 and exhaust stack 48. In the cross-section portrayed by Fig. X, the apertures 76, 77 in the sleeves 72 and 70 register but valve web 44 is shown in position to temporarily block transfer of exhaust gases into chamber 46 through these apertures. In the modification of the apparatus which is shown in Fig. VII, a ported sleeve 78 is outlined in position to block the opening of the transfer port leading to the compressor chamber, and a poppet valve 79 is shown in open position unblocking a port 80 by means of which engine exhaust gases are bypassed directly from the exhaust manifold into chamber 46 and stack 48.

The intake and exhaust ports of the three-cylinder engine 21 which is portrayed in Figs. XXI and XXII are disposed on opposite sides of the cylinder wall just above bottom dead center position of the piston travel. The pistons and cranks of cylinders 1 and 2 are shown (respectively in full and dotted lines) in the positions which they assume at the instant that cylinder 1 begins its puff exhaust through the compressor to supercharge cylinder 2. In this assembly a displacement compressor 25 is shown mounted on a horizontal axis and equipped at one end with the hot gas transfer valves 40, 44 and at its other end with air transfer control valves 82, 84. Scavenging air for the unit is delivered from atmosphere by a low pressure fan 23. Valves 40 and 82 are rotatably mounted on a common shaft and are similar in general design to valve 40 of Fig. I.

In the engine 21 of this assembly, the intake port 19 and the exhaust port 27 of a cylinder open and close symmetrically with respect to the bottom dead center position. Because the exhaust port is higher than the intake port, movement of the piston on its down stroke opens the exhaust port ahead of the intake port (Fig. XXII), and movement of the piston on the upstroke closes the exhaust port after the intake port has closed. In order to satisfy the requirement of the present invention that the intake ports shall remain open after the exhaust ports have closed, special rotary valves 88—89—90 have been mounted within the cylinder exhaust ports, such valves being dimensioned and timed to effect complete cut-off of cylinder exhaust ahead of intake port closure. Figs. XXI—XXII, XXX—XXXI show valve 88 for cylinder 1 in wide open position, with valve 89 for cylinder 2 in position where the exhaust is just closing at a point 120° crank angle ahead of the corresponding valve for cylinder 1, as required by Fig. XIII. Valve 89 for cylinder 2 remains in closed position for a period of 60° crank angle beyond the position illustrated, at which time the piston in cylinder 2 on its return stroke closes the exhaust port. Valve 90 in the exhaust port of cylinder 3 is shown as moving toward the position which is illustrated for valve 88 of cylinder 1.

Instead of providing valves such as valves 88, 89, 90 for controlling the exhaust ports of each cylinder, similar valves can be mounted in the intake port of each cylinder. In this modification (not illustrated) the intake port would have to be higher than the exhaust ports so as to open before and close after the shorter exhaust ports. The valves in the intake port would then be proportioned and timed to keep the intakes closed during the downstroke of the pistons until after the pistons had opened the lower exhaust ports for a period of time sufficient to allow discharge of the puff wave portion of the exhaust gases.

In Figs. XXI—XXII, XXIV—XXVII valves 40 and 82 at opposite ends of the displacement compressor are shown in a position which they assume at the beginning of the period in which a puff discharge of gas from one cylinder (1) is given a free path past port 41 of valve 40 into the compressor 25 for the purpose of further compressing and ramming an air charge from the compressor through port 86 of valve 82 into the intake manifold and thence into another cylinder just completing its intake period (2). During this period delivery of scavenging air from fan 23 is blocked by valve 82 and its wing 84. Valves 40 and 82 and the shaft on which they are mounted rotate at thee times crank shaft speed, completing three compressor cycles for each engine crank shaft revolution. Thus during a puff period extending over 30° crank angle, the valves 40 and 82 rotate through 90° valve angle, at the end of which period the displacement compressor is disconnected both from the exhaust manifold and from the intake manifold.

During the scavenging period about half of the air delivered by the fan 23 flows into the intake manifold past wing 84 of valve 82, the scavenging air sweeping out the exhausting cylinder (1) through the exhaust port and exhaust manifold and from there past valve wing 44 into the exhaust stack 48 by way of chamber 46. Simultaneously the other half of the air from the fan 23 flows into the compressor 25 by way of valve port 86 and sweeps out exhaust gases from the compressor through valve port 41 into chamber 50 and thence through nozzle 52 and stack 48 to atmosphere.

Figs. XXVIII—XXIX portray an adjustment of the apparatus of Figs. XXVI and XXVII whereby the engine assembly may be operated without supercharging. For this purpose apertured sleeve valves and bushings are provided encircling valves 82, 84 and arranged for shifting into position to block transfer of supercharge air from the displacement compressor into the intake manifold by turning a control sleeve 92 through a crank angle of 45–50° into blocking position (Fig. XXVIII). Simultaneously a bypass butterfly valve 94 should be opened to pass air from fan 23 into the intake manifold during that portion of the air intake period which would otherwise be taken up with a ram supercharging operation. No additional valves are necessary on the exhaust side of the displacement compressor, although an additional bypass port and valve such as illustrated in Fig. VII might be provided (not illustrated) to connect the exhaust manifold directly with the exhaust stack 48.

While the valves 40 and 82 at opposite sides of the displacement compressor must be driven at three times crank shaft speed when having only one wall port, fan blower 23 should be driven at a much higher speed, while the valves 88, 89, 90 controlling the cylinder exhaust ports should only be rotated at crank shaft speed.

In Fig. XXIII a displacement compressor 25 is shown assembled in a power unit with an eight-cylinder opposed piston type engine. Cylinder 1 of the engine is shown with the piston at its upper end approaching the end of its upstroke and just beginning to open exhaust port 29, while the piston at the lower end of the cylinder has passed the midpoint of its stroke, but has not yet reached the position where it will uncover the air intake port 31. The crank of the upper piston is shown as out of phase with and leading the crank of the lower piston by an angle $d$ (Figs. XII, XVIII) of approximately 20°. The corresponding pistons and cranks for cylinder 4 operate in phase with those for cylinder 1. The eight cylinders are disposed in two vertical banks at opposite sides of the compressor 25, and the cylinders are paired as indicated by the crank diagrams. The exhaust ports 29 of cylinders 1, 2, 3 and 4 in one bank are connected by a common exhaust manifold 45, and the intake ports of these same cylinders are connected by a common intake manifold 47. Similarly exhaust ports of cylinders 5, 6, 7 and 8 in the other bank are connected by a common exhaust manifold 53, and the intake ports of these same cylinders are connected by a common intake manifold 55.

Ported cylinder valves 40, 83 and 82, 85 are rotatably mounted respectively at the gas and air transfer ends of the compressor on a common valve shaft 57. Extension valves 83 and 85 differ in design from valves 44 and 84 of Figs. XXI, XXII in having fully cylindrical wall extensions of valves 40, 82, respectively, with regular wall ports formed therein. The compressor housing has two pairs of oppositely disposed wall ports at the gas inlet and exhaust end aligned with the port of valve 40 and a pair of opposite bypass ports aligned with port 68 of valve 83. Similar paired air transfer ports are disposed at the air transfer end of the housing. One of the compressor scavenging air inlet ports 59 and one of the compressor gas exhaust ports 60 are indicated by dotted lines in Fig. XXIII, while corresponding parts at the front side of the compressor do not appear in this sectional view.

At the period of the operating cycle which is shown in Fig. XXIII, cylinders 1 and 4 are just commencing puff exhaust, and the wave of exhaust gases is being transferred into the upper end of the compressor through valve port 41, while a final supercharge of compressed air is simultaneously being rammed from the bottom of the compressor through valve port 86 and intake ports 31 into cylinders 5 and 8. The piston at the bottom of cylinder 5 is shown as commencing its upstroke advancing toward closure of the intake port, while the piston at the top of the cylinder is leading the bottom piston by about 20° crank angle and has already closed the exhaust port 29.

At the period of the compressor cycle immediately preceding that portrayed, the compressor was scavenged by air from a blower or fan (not shown) entering from an air supply duct 63 through housing port 59 and valve port 86, with simultaneous escape of exhaust gases from the other end of the compressor to atmosphere through valve port 41, housing port 60 and exhaust duct 65. Simultaneously with this period of compressor scavenging, cylinders 5 and 8 had been scavenged by air from supply duct 63 transferred through valve port 67 (in valve wall 85) and intake ports 31, and exhaust gases had been discharged from these cylinders to atmosphere by way of exhaust ports 29, valve port 68 (in valve wall 83) and exhaust duct 65.

Since the top pistons in the cylinders 1 and 4 lead the bottom pistons in phase by 20° crank angle, they open the exhaust ports to allow an initial puff exhaust gas discharge from the cylinders before scavenging air is admitted thereto. Likewise, at the same period of the cycle, the top pistons in cylinders 5 and 8 lead the bottom pistons by 20° crank angle, thereby cutting off escape of air from these cylinders while the bottom air intake ports are still open to allow intake of ram supercharge air from the compressor 25.

The four crank shafts of the eight-cylinder opposed piston engine shown may be interconnected in proper phase relation by suitable gearing 69, with which the valve shaft 57 is operatively connected. During a period of the compressor cycle following that illustrated, a puff exhaust from cylinders 6 and 7 will effect a ram supercharge of cylinders 1, 4. Later in the cycle, a puff exhaust from cylinders 2, 3 will effect a ram supercharge of cylinders 6, 7. Still later, a puff exhaust from cylinders 5, 8 will effect a ram supercharge of cylinders 2, 3. Thereafter the compressor cycle will be repeated beginning with a puff exhaust from cylinders 1, 4.

In any two-cycle engine equipped with a scavenging air blower, the capacity of the blower must be such as to supply all of the air required for combustion and enough additional air to take care of that which is lost by discharge with the products of combustion during the scavenging operation. In efficient units the total amount of air required to scavenge an engine cylinder will amount to approximately 1.3 times the piston displacement. For practicing the present invention, the capacity of the blower has to be such as to scavenge the engine cylinders and also reload the displacement compressor; the amount of compressor scavenging air required depending on the degree to which it is desired to supercharge the engine and on the amount of additional air required to effect scavenging of the compressor.

The gas flow diagram Fig. XVI illustrates graphically the weight of air required for scavenging the engine and pump or compressor units of a typical displacement compressor ramming supercharge operation. During the scavenging period illustrated by diagram XVI, all of the air which is used by one engine cylinder during a complete cycle is supplied from the blower, approximately half of the air flowing to the engine cylinder and the other half flowing to the compressor or pump for an assumed 100% supercharge effect. The scavenging of both the engine cylinder and the compressor proceeds simultaneously, with the residual combustion gases discharging into a common exhaust stack. Toward the end of the scavenging period some fresh air escapes along with the combustion gases, the amount of air thus escaping representing the air scavenging loss. The weight of the air which the blower delivers to the engine and compressor during this scavenging period balances the weight of the mixture of engine exhaust gases and air which leaves the engine and compressor through the stack. During the supercharging period (Fig. XVII) which follows the scavenging period, the puff exhaust gases from one engine cylinder simply displace most of the air stored in the compressor into another engine cylinder taking in supercharge, so that all of the gases involved remain within the chain of spaces represented by the exhausting cylinder, the exhaust manifold, the compressor, the intake manifold, and the intaking cylinder.

The cylinders of the three cylinder engines illustrated have the firing order 1—3—2. As shown in Figs. XII–XV, during the period when cylinder 1 is starting its gas exhaust, cylinder 2 is finishing its air intake. Likewise, while cylinder 3 is starting its gas exhaust, cylinder 1 is finishing its air intake. Likewise, while cylinder 2 is finishing its gas exhaust, cylinder 3 is finishing its air intake. Consequently when a three cylinder engine having the firing order indicated is operatively connected with a displacement air compressor to permit use of the compressor for supercharging, cylinders of the engine must be paired in practicing the supercharging operation in such a way that the energy carried by the puff exhaust gas wave discharged from one cylinder (1) of a pair at the beginning of its exhaust period can be utilized for compressing and ramming air into the other paired cylinder (2) during the last part of its intake period. During the first part of the air intake period for each engine cylinder scavenging air may be supplied thereto directly from a blower at moderate pressure.

As shown in Figs. I and XII–XV, the intake ports of the engine illustrated in Figs. I to XI are opened and closed symmetrically to the bottom dead center positions by movement of the pistons 33. The period of intake port opening may be from 60° crank angle before bottom dead center to 60° after bottom dead center. The opening and closing of the exhaust ports 28 is under the control of poppet valves 34 which are preferably timed to open at approximately 80° to 90° before bottom dead center position of the piston and to close approximately 20° to 30° after bottom dead center. The engine illustrated is termed a "uniflow" engine because scavenging air enters the cylinder at one end during the scavenging period and sweeps the cylinder clear of exhaust gases by a continuously moving swirl of scavenging air flowing toward exhaust ports at the other end.

With the exhaust gas transfer valve arrangement which is illustrated in Figs. I–VI, the displacement pump 24 is communicably connected in cyclic succession first with the exhaust manifold 32 and cylinder exhaust ports 28 during approximately one quarter of one revolution of the valve, after which the compressor is connected with the scavenging gas outlet chamber 50 over the remaining approximately three-fourths revolution of the valve. During the first period the puff exhaust gases from an engine cylinder flow rapidly into the compressor space, while during the second period of the valve cycle the gases filling the compressor space are discharged therefrom to atmosphere in front of a wave of scavenging air. This compressor cycle must be repeated for every cylinder exhaust puff period of the engine, so that with a three-cycle engine the valve 40 must be rotated at three times crank shaft speed. By providing the valve 40 with twice the number of ports which are shown in Figs. I to VI, its speed may be reduced to one and one half times engine crank shaft speed. The puff exhaust gas wave from an engine cylinder can only be projected with full force into the compressor when all other exits are blocked. It is for this reason that the valve 40 is provided with a segment 44 which is in position to block escape of gases from the exhausting cylinder into bypass chamber 46 during the puff exhaust ramming period of the compressor cycle. During the period in which the compressor is scavenged segment 44 of the valve is in unblocking position, permitting rapid discharge of exhaust gases from the engine cylinder into the exhaust stack pipe 48. The exhaust stack 48 and the nozzle 52 are preferably proportioned in accordance with the normal operating speed of the engine so as to reduce as much as practical loss of scavenging air during the scavenging period of the compressor and engine cylinders.

When operating any of the assemblies of two-cycle engine, blower and displacement compressor herein portrayed on a supercharging cycle, the air-supply ends of the blower and compressor must function to successively: (a) transfer air at blower delivery pressure (for example 5 lbs. gauge) through an intake manifold to intake ports of a cylinder of the engine which is operatively connected to the blower during the cylinder intake period; (b) transfer compressed supercharge air under higher pressure (for example 15 lbs. gauge) from the air delivery end of the displacement compressor as a puff supercharging wave through the intake manifold into the intaking cylinder at the end of the intaking period; (c) simultaneously with the scavenging period a introduce scavenging air at blower pressure into the displacement compressor.

Likewise the hot gas transfer end of the displacement compressor, together with the valve disposed therein, must function to: (d) transfer the first high pressure puff exhaust gas wave from a gas exhausting cylinder into the hot gas intake end of the compressor during the supercharging period b; (e) cut off transfer of puff exhaust gas to the compressor and switch the exhaust gas discharged from the exhausting cylinder during the scavenging period of the cylinder exhaust into the waste gas stack leading to atmosphere; (f) simultaneously with actions c and e, open the connection between the compressor and exhaust chamber for the purpose of scavenging the compressor before beginning a new cycle.

When operating the engine normally without supercharging, the hot gas transfer end of the compressor and the valves disposed therein according to Figs. VII to XI, should also function to: (g) interrupt transfer of puff exhaust gases between the engine cylinders and the displacement compressor, and discharge all of the engine exhaust gases directly through the exhaust stack to atmosphere throughout the entire cylinder exhaust period.

It will be understood that during steps b and d, the exhaust valves or ports of the air intaking cylinder have already closed, and that only the intake ports are open, so that any ramming supercharge air wave which enters the intaking cylinder is trapped therein, with the intake port closing at approximately the instant the supercharge air has reached its peak pressure. Periods b and d may be relatively short (approximately 20° to 30° crank angle) because with high speed engine operation (for example 1200 R. P. M.) a short period is sufficient when pressure heads are available for removing puff exhaust gases from one cylinder and for ramming supercharge air into the other cylinder.

The intake and exhaust port timings for a preferred operating cycle have been shown in the diagrams of Figs. XII, XIII, XIV and XV. For a three-cylinder engine having a firing interval of 120° crank angle, the puff exhaust period $d$ has been shown as approximating 30° crank angle, which allows sufficient time for the puff exhaust gas from the exhausting cylinder to reach a pressure balance with the air being rammed from the displacement compressor into the intaking cylinder. The scavenging periods $a$ and $c$ must have sufficient length to permit removal of all residual engine exhaust gases from the engine cylinder and compressor. The total cylinder exhaust period $d$ plus $e$ should not exceed the firing interval of 120° crank angle. If $d$ plus $e$ exceeded the firing interval, then the puff exhaust wave of the cylinder firing next in order could push back exhaust gases into the cylinder being scavenged, which at that period ought to be receiving only fresh ramming air from the same puff wave. If the total cylinder exhaust period is slightly less than the firing interval, a small dead period $h$ is left between the exhaust period of one cylinder and the beginning of the exhausting period of the next cylinder. During this dead period $h$ the exhaust port of the cylinder is blocked and the intake port is still open, so that this dead period is available for boosting the pressure of the air within the cylinder up to blower pressure level.

The ramming supercharge period $b$ must cover enough time for propagating the peak supercharge wave into the intaking cylinder. The puff exhaust period $d$ and the ramming supercharge period $b$ are closely interrelated and may be short (i. e., 20° crank angle) for engines of low or medium operating speed, but must be longer, i. e., 30° crank angle, for high speed engines. The total air intake period $a$ plus $b$ also should not exceed the firing interval, because if the ramming period in one cylinder were to overlap the scavenging period in another, the ramming effect would be weakened through loss or air through the scavenging cylinder. The valve timing angles should in any case represent effective transfer periods, taking into consideration the gradual beginning and ending of the valve lift curves in conjunction with valve port sizes, operating speeds and similar factors.

Two simple valve timing diagrams are portrayed in Figs. XIII and XVIII, Fig. XIII giving the diagram for a three or six-cylinder engine, and Fig. XVIII for a four or eight-cylinder engine. In both diagrams, exhaust port openings and closings are designed respectively "$E_o$" and "$E_c$," the distance $E_o$ to $E_c$ measuring the entire exhaust period. In the same way $I_o$ and $I_c$ measure the limits of the air intake period. Since such exhaust and intake periods extend over one firing interval, it should be clear that a puff exhaust wave issuing from cylinder 1 of a three-cylinder engine during the period $d$ produces a supercharge ramming intake $b$ during the latter part of the intake period in cylinder 2. The puff exhaust period and the ramming intake period both occur simultaneously over 30° crank angle, while the scavenging periods for both the exhausting and intaking cylinders extend over 90° crank angle. For a six-cylinder engine, which is a combination of two symmetrical three-cylinder engines, the operating cycles of cylinders 1 and 6, or 2 and 5, or 3 and 4, are in phase. Thus, one single displacement pump may be designed to supercharge all six cylinders. The volumetric capacity of such a pump, and the valve ports therefor, must be enlarged to handle gas and air at double the rate of a pump serving only three cylinders. The degree of supercharge for a pump thus enlarged should be slightly higher, because the parasitic volume space between the pump and the engine ports should be proportionately slightly less.

For four and eight-cylinder engines the firing interval is 90° crank angle, which shortens the allowable exhaust and intake periods to within the same limits. A four-cylinder engine must be laid out with the cranks of the respective cylinders 90° apart (Fig. XVIII). Two such four-cylinder units may be combined into an eight-cylinder in line engine (Fig. XIX) with the cylinders operating in pairs 1 and 8, 2 and 7, 3 and 6, and 4 and 5; the cylinders of each pair performing simultaneous cycles. In a V-8 engine the two four-cylinder banks are mounted on inclined axes spaced at an angle of 90°, allowing the use of a four-cylinder engine crank shaft with 180° crank spacing (Fig. XX). In this assembly cylinders 1 and 4, 5 and 8, 2 and 3, and 6 and 7 may be paired for simultaneous operation. Thus a single displacement compressor may be connected to handle either four cylinders or eight cylinders in one power unit, and the eight cylinders may be arranged in four groups of pairs with 90° crank angle firing interval between pairs. The four-cylinder banks may be arranged in parallel in vertical or inclined planes.

In the pressure time chart of Fig. XV, the pressures developed both in the exhaust manifold and in the intake manifold are plotted over one complete engine cycle or one full revolution, starting with top dead center position of crank 1, through bottom dead center position, and back to top dead center position. During the period plotted, there are three cylinder exhausts and three intakes. The blower maintains a steady pressure level above atmospheric which is the base pressure for the intake manifold and for the displacement compressor. The pressure head developed by the blower need only be a few pounds (say five pounds above atmospheric) to assure efficient scavenging of the engine cylinders and of the compressor. The supercharge pressure is superimposed on this base blower pressure in the form of ramming waves which occur at equally spaced periodic intervals. One ramming wave may, for example, begin with the opening $E_o1$ of the exhaust valve of cylinder 1. At this same instant the exhaust valve of cylinder 2 must close at $E_c2$. The intake port of cylinder 2 closes at the instance $I_c2$, which coincides with the peak of the ramming wave. The receding period of the ramming wave following the point $I_c2$ helps to initiate the following scavenging cycle beginning with $I_o1$.

If during the ramming period the displacement compressor is in direct communication with the discharge side of the blower and with the intake manifold, as in the system portrayed in Fig. I, the pressure wave follows the heavy line of Fig. XV and carries into the blower delivery port as well as into the intaking cylinder. Thus with this arrangement the blades of the blower are subjected to periodic back pressure waves coinciding with the supercharge waves. These back pressure waves, however, are not so heavy as to seriously interfere with the operation of a Root's type blower. In the engine assembly which is portrayed by Figs. XXI and XXII, the blower is shielded against back pressure waves developed within the supercharging compressor by an air valve mounted in the air discharge side of the compressor. The closing of this valve during the supercharging period of the cycle creates at the discharge side of the fan blower only a slightly increased pressure along the indicated dotted pressure line. With this modified design no air is delivered from the blower into the engine cylinders during the ramming period of the cycle, and pressure rise at the delivery side of the blower is inversely proportional to the volumetric capacity of the receiver space between the blower or fan blades and the blocking compressor valve. Even this moderate pressure surge can be avoided when the general assembly design of Figs. XXI and XXII is employed in connection with a V-12 engine having two banks of six cylinders each, assembled in a V-angle of 60°. With such an arrangement, there would be a continuous air delivery from the fan blower to the cylinders in one or the other of the two banks, and consequently no opportunity to build up back pressure.

During the scavenging period of the cycle, the pressure in the exhaust manifold is substantially atmospheric, while the pressure inside the engine cylinder is higher than atmospheric, though below blower pressure as indicated by the dash line in Fig. XV. The pressure inside the displacement compressor is built up during the scavenging period to full blower pressure, when the blower and compressor are assembled as in Fig. I. However, in the assembly of Fig. XXI the pressure developed within the displacement compressor during the scavenging period is slightly lower because of the flow resistance which is offered by the valve interposed between the fan and the displacement compressor.

Having thus described the invention, what is claimed as new is:

1. The method of supercharing the cylinders of a multi-cylinder two-stroke internal combustion engine which comprises, maintaining a body of air under predetermined low superatmospheric pressure while transferring scavenging air therefrom into a cylinder during the last portion of its waste gas exhausting period and the first portion of its air intake period, at the end of the gas exhausting period blocking further escape of gas and air from said cylinder while boosting the pressure of said air body and ramming the thus compressed air body as a supercharge into said cylinder at the end of its air intake period, and carrying out said pressure boosting and ramming operation by pressure balancing displacement of the air by a rapidly advancing wave of hot gaseous products of combustion discharged under high pressure from a second cylinder at the commencement of its waste gas discharge period.

2. The method of supercharging as defined in claim 1 in which replenish air from a source is supplied to said body at a rate to maintain the pressure thereof substantially uniform during the scavenging period, and in which said source is shielded during the pressure boosting and ramming period against direct impact by the advancing hot gas wave.

3. In energy conversion apparatus, a two-stroke cycle internal combustion engine having operatively paired cylinders with pistons mounted therein, an exhaust port and an air intake port for each cylinder, said paired cylinders being timed for operation of one cylinder on the last part of its air intake period while the second paired cylinder is commencing its gas exhaust period, a displacement compressor comprising an elongated walled chamber, a hot gas transfer conduit connecting the exhaust port of the second cylinder with one end of the compressor, a gas discharge outlet ported out of the same end of the compressor, an air transfer conduit connecting the intake port of the first cylinder with the other end of the compressor, an air inlet ported out at that end of the compressor, and valve mechanism arranged for actuation and timing by the engine to operatively connect the cylinders through said conduits and displacement compressor at a supercharging period of the cycle, and to subsequently break such connection and effect simultaneous connection of the compressor gas discharge and air intake ports for compressor scavenging preliminary to a new cycle.

4. In energy conversion apparatus, a multi-cylinder two-stroke cycle internal combustion engine having its cylinders arranged in groups, each cylinder of a group operating on a cycle having a crank angle spacing of 90°–120° with respect to the other cylinders of the same group, an exhaust manifold connecting the exhaust ports of all cylinders in a group, an intake manifold connecting the intake ports of all cylinders of the group, a displacement air compressor comprising a wall enclosed housing, gas inlet and discharge ports at spaced points in the housing adjacent one end thereof, air inlet and discharge ports in the housing adjacent the other end thereof, a conduit connecting the exhaust manifold of one group of cylinders with the gas inlet of the compressor, a blower mounted in position to supply air to the air inlet of the compressor, and means including valve mechanism actuated and timed by the engine for periodically compressing a charge of air within the compressor and discharging same therefrom by pressure balancing displacement action of a wave of hot engine exhaust gases introduced to the gas inlet end of the compressor from the exhaust manifold during the gas exhaust period of one of said cylinders.

5. Energy conversion apparatus as defined in claim 4 together with a second conduit connecting the intake manifold of the same group of cylinders with the air discharge port of the compressor, said valve mechanism including the engine pistons and being arranged for actuation and timing by the engine to operatively connect two cylinders of a group through said conduits and compressor at one period of the compressor cycle, and to subsequently break such communication and effect simultaneous opening of the compressor gas discharge and air intake ports for scavenging at a later period of the cycle.

6. Apparatus as defined in claim 4 together with a gas bypass chamber at the gas intake end of the compressor, and means operatively connected with said valve mechanism arranged to connect the engine exhaust manifold alternatively to the compressor chamber and to said bypass chamber.

7. Apparatus as defined in chamber 4 together with a ported cylinder valve rotatably mounted at the air intake and air discharge end of the compressor, and means operatively associated therewith whereby to control supply of air from said blower to the compressor and to the engine intake manifold.

8. In energy conversion apparatus, a multicylinder two-stroke cycle internal combustion engine having its cylinders arranged in groups, each cylinder of a group operating on a cycle having a crank angle spacing of 90°–120° with respect to the other cylinders of the same group, an exhaust manifold connecting the exhaust ports of all cylinders in the group, an intake manifold connecting the intake ports of all cylinders of the same group, a displacement air compressor comprising an elongated tubular housing, pressure gas inlet and discharge ports at spaced points in the wall of said housing adjacent one end thereof, an air inlet and discharge port in said housing adjacent the other end thereof, a ported cylinder valve mounted at the gas inlet and discharge end of the housing in position to control said spaced ports, a conduit connecting the exhaust manifold with said compressor gas inlet, a second conduit connecting the intake manifold with the air inlet and discharge port of the compressor, and a blower having a discharge port connected to the intake manifold.

9. In energy conversion apparatus, a multicylinder two-stroke cycle internal combustion engine having its cylinders arranged in groups, each cylinder of a group having a piston therein arranged for reciprocation on a cycle having a crank angle spacing of 90°–120° with respect to pistons in other cylinders of the same group, an intake manifold connecting the intake ports of all cylinders of the same group, a displacement compressor comprising a wall enclosed housing, air inlet and discharge ports in said housing adjacent one end thereof, a conduit connecting the intake manifold with the air discharge port of the compressor, a blower having a discharge port connected to the air inlet port of the compressor, and means including valve mechanism actuated and timed by the engine for periodically compressing a charge of air within the compressor and transferring said compressed air body as a supercharge into a cylinder of said group during its intaking period.

10. Energy conversion apparatus as defined in claim 9 in which the blower is provided with meshing rotor blades forming a sealing closure against escape of air from the compressor to atmosphere, and in which the valve mechanism includes the engine pistons and is timed to introduce air at blower pressure to the compressor and engine cylinder during the first part of its intaking period, and to carry out the compressing and supercharging operation during the last part of the intaking period.

11. In energy conversion apparatus, a multicylinder two-stroke cycle internal combustion engine, pistons operable in said cylinders, gas exhaust ports and air inlet ports for said cylinders, an exhaust manifold communicably connected wth the gas exhaust ports of cylinders the pistons in which reciprocate in sequence with a crank angle spacing of 90°–120°, a gas displacement compressor comprising an elongated tubular housing, an exhaust gas transfer port at one end of the housing connected to the exhaust manifold, a gas discharge port at the same end of the housing, an air discharge port and an air intake port each located at spaced points adjacent the other end of the housing, and valve mechanism including the pistons in cylinders connected to said manifold arranged so that at one portion of a compressor cycle the housing air discharge port is communicably connected through the exhaust manifold with the interior of a gas exhausting cylinder, and later in the cycle the housing air intake and gas discharge ports are communicably connected while communication between the engine cylinders and the housing air discharge port is blocked.

12. In energy conversion apparatus, a multicylinder two-stroke cycle internal combustion engine, pistons operable in said cylinders, gas exhaust ports and air inlet ports for said cylinders, an exhaust manifold communicably connected with the gas exhaust ports of cylinders the pistons in which reciprocate in sequence with a crank angle spacing of 90°–120°, an intake manifold communicably connected with the intake ports of cylinders the pistons in which reciprocate in sequence with a crank angle spacing of 90°–120° with respect to pistons in cylinders connected to the exhaust manifold, a gas displacement air compressor comprising an elongated tubular housing, an exhaust gas transfer port at one end of the housing connected to the exhaust manifold, a gas discharge port at the same end of the housing, an air intake port and an air discharge port adjacent the other end of the housing, a conduit communicably connecting the housing air discharge port with the engine intake manifold, and valve mechanism including the pistons in the cylinders connected to said manifolds arranged to simultaneously connect a cylinder exhaust port through the compressor housing with the intake port of a cylinder operating with a crank angle spacing of 90°–120°, and subsequently to interrupt such connection and communicably connect the housing air intake and gas discharge ports during the last part of the compressor cycle.

13. The method of supercharging cylinders of a multicylinder two-stroke cycle internal combustion engine which comprises, establishing a body of air under predetermined low superatmospheric pressure while introducing scavenging air into a cylinder during the last portion of its waste gas exhaust period and the first portion of its air intake period, at the end of the gas exhausting period blocking escape of gas and air from said cylinder while boosting the pressure of said air body and ramming the thus compressed air body as a supercharge into said cylinder at the end of its air intake period, carrying out said pressure boosting and ramming operation by pressure balancing displacement of the air by a rapidly advancing wave of hot gaseous products of combustion discharged under high pressure from a second cylinder at the commencement of its waste gas exhaust period, and at the end of said pressure-boosting and ramming operation expanding the exhaust gas remaining in the second cylinder and that which displaced the air body directly to atmosphere preparatory to a new cycle.

14. The method of supercharging the cylinders of a multicylinder two-stroke cycle internal combustion engine which comprises, trapping a body of air in a chamber under predetermined low pressure while introducing scavenging air under low pressure into a cylinder during the last portion of its waste gas exhaust period and the first part of its air intake period, at the end of the gas exhausting period blocking further escape of gas and air from said cylinder while boosting the pressure of said air body and ramming the thus compressed air body as a supercharge into said cylinder during the last portion of its air intake period, and carrying out said pressure boosting and ramming operation by pressure balancing displacement of the air by a rapidly advancing wave of hot gaseous products of combustion discharged under high pressure from a second cylinder at the commencement of its waste gas exhaust period.

15. An engine supercharging operation as defined in claim 14 together with the step of discharging exhaust gases from the chamber after the completion of the pressure boosting and ramming operation, and trapping a fresh supply of air therein at the pressure of the scavenging air source in the period remaining before another pair of cylinders begin their supercharging and gas exhaust periods respectively.

16. An engine supercharging operation as defined in claim 14 in which the pressure boosting and ramming operation is completed within not more than one third of the gas exhaust period of the second cylinder.

17. An engine supercharging operation as defined in claim 14 in which the pressure of the scavenging air is approximately 3–5 lbs. gauge pressure, and in which the first cylinder is supercharged to a pressure of 25–30 lbs. absolute.

18. An engine supercharging operation as defined in claim 14 in which gas discharged from the second cylinder during the first puff exhaust stage of the gas exhaust period is expanded down to a balancing pressure of approximately 25–30 lbs. absolute during the pressure boosting and ramming operation, and in which during the second stage of the gas exhaust period within said second cylinder the balance of the exhaust gases remaining therein together with scavenging air is discharged directly to atmosphere while simultaneously discharging exhaust gases from the displacement chamber directly to atmosphere.

JOHANN J. WYDLER.